US012618023B2

(12) United States Patent
Barne et al.

(10) Patent No.: US 12,618,023 B2

(45) Date of Patent: May 5, 2026

(54) HARD SURFACE CLEANING COMPOSITION

(71) Applicant: Conopco, Inc., Englewood Cliffs, NJ (US)

(72) Inventors: Sameer Keshav Barne, Bangalore (IN); Rachana Sankar, Bangalore (IN); Jayashree Anantharam Vadhyar, Bangalore (IN)

(73) Assignee: Conopco, Inc., Englewood Cliffs, NJ (US)

( * ) Notice: Subject to any disclaimer, the term of this patent is extended or adjusted under 35 U.S.C. 154(b) by 386 days.

(21) Appl. No.: 18/027,465

(22) PCT Filed: Sep. 20, 2021

(86) PCT No.: PCT/EP2021/075774

§ 371 (c)(1),
(2) Date: Mar. 21, 2023

(87) PCT Pub. No.: WO2022/058582

PCT Pub. Date: Mar. 24, 2022

(65) Prior Publication Data

US 2023/0365900 A1 Nov. 16, 2023

(30) Foreign Application Priority Data

Sep. 21, 2020 (EP) .................................... 20197227

(51) Int. Cl.

| | |
|---|---|
| ***C11D 3/00*** | (2006.01) |
| ***C11D 1/83*** | (2006.01) |
| ***C11D 1/94*** | (2006.01) |
| ***C11D 3/20*** | (2006.01) |
| ***C11D 3/32*** | (2006.01) |
| ***C11D 3/43*** | (2006.01) |
| ***C11D 3/48*** | (2006.01) |
| *C11D 1/14* | (2006.01) |
| *C11D 1/72* | (2006.01) |
| *C11D 1/90* | (2006.01) |

(52) U.S. Cl.

CPC .................. *C11D 3/48* (2013.01); *C11D 1/83* (2013.01); *C11D 1/94* (2013.01); *C11D 3/2068* (2013.01); *C11D 3/32* (2013.01); *C11D 3/43* (2013.01); *C11D 1/146* (2013.01); *C11D 1/72* (2013.01); *C11D 1/90* (2013.01); *C11D 2111/14* (2024.01)

(58) Field of Classification Search

CPC .... C11D 3/48; C11D 1/83; C11D 1/94; C11D 3/2068; C11D 3/32; C11D 3/43; C11D 1/146; C11D 1/72; C11D 1/90; C11D 2111/14; C11D 1/29; C11D 17/0008; A61K 8/33; A61K 8/345; A61K 8/42; A61K 8/466; A61Q 17/005; A61Q 19/10

USPC ........................................................ 510/237

See application file for complete search history.

(56) References Cited

U.S. PATENT DOCUMENTS

| | | | |
|---|---|---|---|
| 5,281,354 A | | 1/1994 | Faber |
| 6,566,321 B1 | | 5/2003 | Thekkekandam et al. |
| 9,661,847 B2 | | 5/2017 | Koshti et al. |
| 2015/0252310 A1 | | 9/2015 | Blattner et al. |
| 2015/0252312 A1 | | 9/2015 | de Villeneuve et al. |
| 2018/0371376 A1 | * | 12/2018 | Hayward ............. C11D 3/2044 |
| 2019/0374794 A1 | | 12/2019 | Kamps et al. |
| 2021/0062114 A1 | | 3/2021 | Bhattacharya et al. |

FOREIGN PATENT DOCUMENTS

| | | |
|---|---|---|
| CN | 108699494 A | 10/2018 |
| CN | 108753479 A | 11/2018 |
| EP | 2782549 A2 | 10/2014 |
| EP | 3118298 A1 | 1/2017 |
| EP | 3418361 A1 | 12/2018 |
| WO | 2011086421 A1 | 7/2011 |
| WO | 2013076697 A2 | 5/2013 |
| WO | 2018154298 A1 | 8/2018 |
| WO | 2019115478 A1 | 6/2019 |

OTHER PUBLICATIONS

International Search Report and Written Opinion issued in corresponding International Application No. PCT/EP2021/075774 completed Dec. 16, 2021 (12pp.).

International Preliminary Report on Patentability issued in corresponding International Application No. PCT/EP2021/075774 completed Dec. 15, 2022 (10pp.), including claim amendments pursuant to Rule 6.3.

Charles M. Hansen; Hansen Solubility Parameters: A User's Handbook; 2007, pp. 321-344; XP055832605; Taylor & Francis Group LLC.

Written Opinion of the International Preliminary Examining Authority issued in International Patent Application No. PCT/EP2021/075774 dated Oct. 4, 2022.

International Search Report issued in International Patent Application No. PCT/EP2021/075774 dated Jan. 4, 2022.

European Search Report and Written Opinion issued in European Patent Application No. EP20197227 dated Mar. 18, 2021.

* cited by examiner

*Primary Examiner* — Eisa B Elhilo

(74) *Attorney, Agent, or Firm* — Carter, DeLuca & Farrell, LLP; George Likourezos; Bret P. Shapiro

(57) ABSTRACT

The present invention relates to a hard surface cleaning composition. There is a need for improved cleaning compositions for providing antimicrobial benefit in addition to cleaning benefit. The inventors have found that an aqueous composition comprising 0.01 to 20% by weight alkene amide; 0.01 to 20% by weight glycol ether of formula (I): R1O(R2O)nR3; where: —R1 is a linear or branched alkyl or phenyl group having 1 to 8 carbon atoms; —R2 is ethyl or isopropyl; -n is 1, 2, 3; —R3 is hydrogen or a linear or branched alkyl or phenyl group having 1 to 10 carbon atoms; 0.1 to 50% by weight surfactant; and at least 10% by weight water, provides significant antimicrobial benefit.

13 Claims, No Drawings

HARD SURFACE CLEANING COMPOSITION

CROSS-REFERENCE TO RELATED APPLICATIONS

The application corresponds to PCT/EP2021/075774, filed Sep. 20, 2021, entitled "A HARD SURFACE CLEANING COMPOSITION", which claims priority to EP20197227.0 filed Sep. 21, 2020, the entirety of both are incorporated herein by reference.

FIELD OF THE INVENTION

The present invention relates to a cleaning composition, in particular, it relates to an aqueous hard surface cleaning composition providing enhanced antimicrobial benefit.

BACKGROUND OF THE INVENTION

Consumers involve in various cleaning activities in their day-to-day life, such as, laundering, washing utensils, cleaning house-hold items etc. The common goal of the cleaning activities is to wash off foreign elements such as, particulate, dust, dirt, oily soil, microbes etc. residing on a surface. Literature suggests that these elements, particularly microbes may cause serious health issues. Hence it is important for consumers to clean themselves and their surroundings.

Consumers may use water to clean their belongings and it is observed that dust or particulates may be cleaned by washing with water. But certain foreign elements, like oily soil, microbes etc., may not be cleaned by water wash. Hence for better cleaning and enhanced removal of these foreign elements, consumers prefer to use cleaning compositions.

There are different types of cleaning compositions available for cleaning different surfaces or applications, such as, laundry detergent, hard surface cleaners etc. Hard surface herein includes dishes, tableware, cooking utensils, tabletop, ceramic surface, glass surface etc. These compositions differ in terms of quantity of surfactant, types of surfactants, emulsifier, emollient, thickener, sequestrant, builder, perfume etc. For example, dishwash compositions are used for cleaning dishes and kitchen utensils which are having high amount of oily soil deposition. Hence most of the dishwash compositions are rich in surfactant content.

US 2015/0252310 (Ecolab USA Inc., 2015) discloses a hard surface cleaning composition including an anionic surfactant salt, a saturated C8 to C10 alkyl amide solvent, a cosolvent and water that works at least as well as well as d-limonene. The document further discloses that the composition can remove red food soils with up to 20 percent protein and works as an asphalt removal composition.

U.S. Pat. No. 5,281,354 (Amway Corporation, 1994) discloses a liquid cleanser composition for hard surface cleaning. The composition comprises a terpene selected from mono- and sesquiterpenes and mixtures thereof, a water miscible solvent, an amide surfactant and abrasive.

However, consumers desire to have an improved hard surface cleaning composition which is capable of cleaning microbes along with oily soil, dust and particulates from a surface.

Therefore, there is a need for an improved hard surface cleaning composition for providing antimicrobial benefit.

It is an object of the present invention to provide a composition for cleaning a hard surface, in particular, the composition should be able to provide antimicrobial benefit in addition to cleaning.

Surprisingly, the present inventors have found that a hard surface cleaning composition comprising a combination of alkene amide and glycol ether provides significant antimicrobial benefit.

SUMMARY OF THE INVENTION

Accordingly, in a first aspect, there is provided an aqueous hard surface cleaning composition comprising:

a) 0.01 to 20% by weight alkene amide;

b) 0.01 to 20% by weight glycol ether of formula (I):

$$R_1O(R_2O)_nR_3;$$

where, $R_1$ is a linear or branched alkyl or phenyl group having 1 to 8 carbon atoms;

$R_2$ is ethyl or isopropyl;

n is 1, 2, 3;

$R_3$ is hydrogen or a linear or branched alkyl or phenyl group having 1 to 10 carbon atoms;

c) 0.1 to 50% by weight surfactant; and d) at least 10% by weight water.

Accordingly, in another aspect, there is provided a method for cleaning a hard surface, comprising steps of:

optionally wetting the surface;

applying a composition according to the first aspect on the surface using an applicator; and, rinsing the surface with water.

Accordingly, in another aspect, there is provided a use of a composition according to the first aspect for cleaning a hard surface.

These and other aspects, features and advantages will become apparent to those of ordinary skill in the art from a reading of the following detailed description. For the avoidance of doubt, any feature of one aspect of the present invention may be utilized in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight by weight percentages and calculated with respect to total weight of the composition, unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

There is provided an aqueous cleaning composition for cleaning hard surfaces. 'Hard surfaces' herein includes dishes, tableware, cooking utensils, tabletop, ceramic surface, glass surface etc. available in a household. The composition comprises 0.01 to 20% by weight alkene amide, 0.01 to 20% by weight glycol ether of formula (I):

$$R_1O(R_2O)_nR_3;$$

where, $R_1$ is a linear or branched alkyl or phenyl group having 1 to 8 carbon atoms;

$R_2$ is ethyl or isopropyl;

n is 1, 2, 3;

$R_3$ is hydrogen or a linear or branched alkyl or phenyl group having 1 to 10 carbon atoms;

0.1 to 50% by weight surfactant; and at least 10% by weight water.

Alkene Amide

The composition comprises 0.01 to 20% by weight alkene amide. Alkene amide is an organic solvent, used in the composition for removing oily soil and antimicrobial benefit. Alkene amide have following general structure,

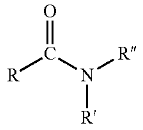

Where R is an alkene group, R' and R" are hydrogen or an alkyl group. When both R' and R" are hydrogen, it is known as primary amide. If any one of R' or R" is an alkyl group, it is known as secondary amide and if both R' and R" are alkyl group, it is known as tertiary amide.

Preferably the composition comprises 0.1 to 15% by weight, more preferably 0.5 to 10% by weight, even more preferably 0.8 to 8% by weight and most preferably 1.0 to 5% by weight alkene amide.

Preferably the alkene amide comprises 8 to 15 carbon atoms. More preferably the alkene amide comprises 8 to 12 carbon atoms.

Preferably the alkene amide is alkyl substituted N, N tertiary amide. A preferred alkene amide is N, N di-methyl decenamide.

Preferably the alkene amide is derived from a renewable source. One of such examples of alkene amide suitable for the invention is STEPOSOL®MET-10 commercially available from Stephan Company, USA.

Glycol Ether

The composition comprises 0.01 to 20% by weight glycol ether of formula (I)

$$R_1O(R_2O)_nR_3;$$

where, $R_1$ is a linear or branched alkyl or phenyl group having 1 to 8 carbon atoms;

$R_2$ is ethyl or isopropyl;

n is 1, 2, 3;

$R_3$ is hydrogen or a linear or branched alkyl or phenyl group having 1 to 10 carbon atoms;

Glycol ether herein refers to a class of organic solvent comprising alkyl ether derivative of ethylene glycol or propylene glycol and it is defined by the formula (I) above. It is found that combination of the glycol ether and the alkene amide provides synergistic antimicrobial benefit.

Preferably glycol ether is selected on the basis of Hansen Solubility Parameters (HSP). HSP is a well-known computational method used to predict solubility of a material in a solvent. In this method, each material molecule is described in terms of three parameters, namely:

$\delta_d$: derived from dispersion forces between molecules, $\delta_p$: derived from dipolar intermolecular forces between molecules, and $\delta_h$: derived from hydrogen bonds between molecules.

Different molecules are represented as points on a three-dimensional space, called Hansen space using aforesaid parameters as coordinates. Additionally, a radius $R_0$, known as interactive radius, is defined for each solute molecule.

To predict solubility of solute (1) in solvent (2), the HSP distance ($R_a$) between the two is calculated, using following formula, $$R_a=[4(\delta_{d1}-\delta_{d2})^2+(\delta_{p1}-\delta_{p2})^2+(\delta_{h1}-\delta_{h2})^2]^{1/2},$$

and corresponding, Relative Energy Difference (RED) is calculated by, $$RED=R_a/R_0,$$

For a solute-solvent system, if RED value is less than 1, it means that the solute is likely to be soluble in the solvent and lower the RED value it is preferable. Whereas RED value more than 1 means that the solute may not be soluble in the solvent. Details on Hansen solubility parameters can be found in the textbooks, such as, "Hansen Solubility Parameters—A User's Handbook", by Dr. Charles Hansen, CRC press, Boca Raton, 1999, 2007. There are software and tools commercially available for calculating HSP parameters. One of such employed here is "HSPiP" $5^{th}$ edition version 5.3.04.

Glycol ethers suitable for the invention have RED values in the order of 0.1 to 0.5, with respect to cooking oil as solute.

Preferably the R1 in the formula (I) of the glycol ether comprises 1 to 4 carbon atoms. Preferably the R3 in the formula (I) of the glycol ether comprises 1 to 4 carbon atoms.

Examples of glycol ether suitable for the invention include mono n-butyl ether, ethylene glycol monomethyl ether, propylene glycol monomethyl ether, propylene glycol mono n-butyl ether, ethylene glycol monohexyl ether, dipropylene glycol monomethyl ether, dipropylene glycol mono propyl ether, dipropylene glycol mono n-butyl ether, and diethylene glycol butyl ether, propylene glycol mono phenyl ether and propylene glycol monomethyl ether acetate.

Preferably the composition comprises 0.1 to 15% by weight glycol ether. More preferably the composition comprises 0.5 to 10% by weight, even more preferably 0.8 to 8% by weight and most preferably 1.0 to 5% by weight glycol ether.

A preferred glycol ether is dipropyl glycol dimethyl ether or tripropylene glycol butyl ether.

Preferably, in the composition, the ratio of the alkene amide to the glycol ether is in the range from 5:1 to 1:5 by weight. More preferably, the ratio of the alkene amide to the glycol ether is in the range from 3:1 to 1:3 by weight. A preferred ratio of the alkene amide to the glycol ether is 1:1 by weight.

Surfactant

The composition comprises 0.1 to 50% by weight surfactant. Surfactant is used in the composition for cleaning benefit. Preferably the composition comprises 0.5 to 40% by weight, more preferably 1 to 30% by weight, even more preferably 1.5 to 20% by weight and most preferably 2 to 15% by weight surfactant.

Preferably the surfactant is selected from a list comprising anionic, cationic, non-ionic, amphoteric surfactant and combinations thereof. More preferably the surfactant is selected from anionic surfactant, non-ionic surfactant and combinations thereof.

Anionic Surfactant

Suitable anionic surfactants are water-soluble salts, particularly alkali metal or ammonium or alkylolammonium salts of organic sulphuric acids and sulphonic acids. Preferably the alkyl group is a branched or straight chain alkyl group or alkyl aryl group. Preferably the salt comprises 8 to 22 carbon atoms, more preferably 6 to 20 carbon atoms in the alkyl part.

Preferably anionic surfactant is selected from higher alkyl aromatic sulphonates such as alkyl benzene sulphonates containing 6 to 20 carbon atoms in the alkyl group. Particular examples are alkyl benzene sulphonates, alkyl toluene, xylene or phenol sulphonates, alkyl naphthalene sulphonates, diamyl naphthalene sulphonate, and dinonyl naphthalene sulphonate.

Preferably anionic surfactant is selected from alkyl sulphate containing 8 to 22 carbon atoms and alkyl ether sulphate containing 1 to 10 ethylene oxide or propylene oxide, preferably 2 to 3 ethylene oxide units per molecule.

Most preferred anionic surfactants are sodium salt of alkyl benzene sulphonate, sodium lauryl ether sulphate, primary alkyl sulphate and combinations thereof.

Non-Ionic Surfactant

Preferably non-ionic surfactant is selected from alkoxylated alkanols in which the alkanols contain 8 to 20 carbon atoms and the number of units of alkylene oxide is from 5 to 30. Preferably the non-ionic surfactant is selected from an alkoxylated linear alcohol, more preferably an ethoxylated linear alcohol. Examples of such compounds are the alkanol having 10 to 15 carbon atoms containing 5 to 12 ethylene oxide groups per mole. One of the preferred non-ionic surfactant is benzyl alcohol ethoxylate.

Suitable non-ionic surfactants include lauryl or myristyl alcohol condensed with ethylene oxide. Examples of such surfactants are laureth 5, laureth 7 and laureth 9.

Another group of suitable non-ionic surfactants are alkyl polyglycosides (APG) which are sugar derivatives of fatty alcohol. Example of such surfactants are decyl glucoside, lauryl glucoside, myristyl glucoside.

Other suitable non-ionic surfactants are sorbitan mono and tri alkanoic acid containing 10 to 20 carbon atoms condensed with ethylene oxide. Examples of such compounds are polyoxyethylene (4) sorbitan monolaurate, polyoxyethylene (20) sorbitan trioleate and polyoxyethylene (20) sorbitan tristearate.

Another example of suitable non-ionic surfactant is polyethylene glycol derivative of hydrogenated castor oil.

Amphoteric Surfactant

The composition may further comprise an amphoteric surfactant. Preferably amphoteric surfactant selected from a derivative of aliphatic secondary and tertiary amines containing an alkyl group of 8 to 18 carbon atoms and an aliphatic radical substituted by an anionic water-solubilizing group, such as sodium 3-dodecylaminopropionate, sodium 3-dodecylaminopropane sulphonate and sodium N–2-hydroxydodecyl-N-methyltaurate.

Amphoteric surfactants suitable for the present invention include cocoamidopropyl betaine (CAPB), cocoamidopropyl amine oxide (CAPAO), cocodiethanol amide (CDEA) and cocomonoethanol amide (CMEA), amine oxide.

A preferred amphoteric surfactant is cocoamidopropyl betaine (CAPB).

Cationic Surfactant

The composition may further comprise a cationic surfactant. Suitable cationic surfactants are quaternary ammonium salts. The ammonium salts have the general formula: $R1R2R3R4N^{+}X^{-}$, wherein R1 is a C12 to C18 alkyl group, each of R2, R3 and R4 independently is a C1 to C3 alkyl group and X is an inorganic anion. R1 is preferably a C14 to C16 straight chain alkyl group, more preferably C16. R2, R3 and R4 are preferably methyl groups. The inorganic anion ($X^{-}$) is preferably chosen from halide, sulphate, bisulphate or hydroxide. More preferably the anion is a halide ion and most preferably the anion is a sulphate or a chloride. Cetyl-trimethylammonium chloride is one of the examples such compounds.

Another type of quaternary ammonium cationic surfactant suitable for the invention is the class of benzalkonium halides, also known as alkyldimethylbenzylammonium halides. One of the examples of such compound is benzalkonium chloride, also known as alkyldimethylbenzylammonium chloride (ADBAC).

pH of the Composition:

The pH of the composition according to present invention is in the range of 5 to 10. Preferably the pH of the composition is in the range of 5.5 to 9.5, more preferably 5 to 9, most preferably 5.5 to 8.5. Preferably, the composition comprises a pH adjuster, such as citric acid, sodium hydroxide for adjusting the pH.

Water

The composition is an aqueous composition and comprises at least 10% by weight of water. Preferably the composition comprises 10 to 95% by weight of water.

The compositions may further comprise solvents for boosting the cleaning efficacy of the composition. Examples of such solvents include linear or branched alcohols having 3 to 8 carbon atoms, alkyl esters having 1 to 4 carbon atoms etc.

Application:

The composition of the present invention may be a dishwash composition. Dishwash compositions are typically used for cleaning dishes and kitchen utensils. Dishwashing includes machine dishwashing and hand dishwashing. In machine dishwashing, a consumer deposits the composition in the dishwashing machine and a wash liquor is formed during wash cycle. On other hand, in hand dishwashing, a consumer takes an aliquot of the composition and apply on the surface using an applicator and subsequently rinse with water. Moreover, machine dishwash compositions are low foaming, whereas hand dishwashing compositions are moderate to high foaming compositions and preferably the surfactants for these compositions are selected accordingly.

Preferably the dishwash composition further comprises builder, sequestrant, fragrance, polymer, colorant, thickener, sensory booster, humectant etc.

The dishwash composition may comprise builder or sequester. Builder or sequester helps in removing or sequestering calcium and/or magnesium ions in the water. Preferably the dishwash composition comprises soluble builder, which may be added to the liquid composition. Sodium citrate is one of the examples of such builders.

Examples of water-soluble organic builder include polycarboxylate polymer, such as polyacrylate, acrylic/maleic copolymer, and acrylic phosphonate, monomeric polycarboxylate such as citrate, gluconate, oxydisuccinate, glycerol mono- di and tri-succinate, carboxy methyl oxy-succinate, carboxy methyl oxy-malonate, dipicolinate and hydroxy ethyl iminodiacetate.

The hand dishwash composition may contain humectant for providing a sensory benefit. Glycerine as humectant may be present in the hand dishwash composition in an amount 0 to 5% by weight. Preferably the glycerine is present in the composition less than 3% by weight, more preferably less than 1% by weight. Higher amount of glycerine may induce slipperiness on the surfaces such as dishes, tableware etc., which is not preferable. Thus lower the amount of the glycerine is preferable.

The dishwash composition intended for machine dishwash, may further comprise an antifoaming agent. Examples of suitable antifoaming agents include silicones, fatty acids. Preferably, the fatty acid, if present, is selected from a group comprising caprylic acid, lauric acid, myristic acid, palmitic acid, stearic acid, oleic acid, 12-hydroxy stearic acid and mixture thereof. The fatty acid may present in the dishwash composition in a concentration of 0.1 to 4% by weight, more preferably 0.3 to 3% by weight and even more preferably 0.5 to 2% by weight of the composition.

Preferably, the amount of water in the dishwash composition is in the range from 10 to 95%, more preferably 20 to 90% and most preferably 30 to 80% by weight of the composition.

The dishwash composition may be used in neat form or in diluted form. Regarding diluted form, preferably the composition is in concentrated form and a consumer dilutes such compositions in water forming a cleaning solution and use it. Particular advantage of the concentrated form is that the composition in such form may be packed in significantly small pack and consumes much less packaging material. Preferably the composition in concentrated form or the concentrated composition comprises 8 to 20% by weight, more preferably 10 to 20% by weight and most preferably 12 to 20% by weight alkene amide. Preferably the concentrated composition comprises 8 to 20% by weight, more preferably 10 to 20% by weight and most preferably 12 to 20% by weight the glycol ether. Preferably the amount of surfactant in the concentrated composition is in the range from 20 to 50% by weight, more preferably 25 to 50% by weight and most preferably 30 to 50% by weight of the composition. The concentrated composition may be diluted 3 to 20 times in water to form a cleaning solution and use it for dishwashing.

Preferably the composition is applied on a hard surface in spray format. Preferably the composition is filled in a container attached with a spray head, wherein the spread head is equipped with a spray trigger dispensing an aliquot of the composition on pressure trigger. Preferably in use, the composition is sprayed on a surface and applied with an applicator.

In another scenario, the composition is applied in foam form. Preferably the composition is filled in a container equipped with a foam trigger dispensing the composition in foam format when triggered. Preferably the composition is dispensed in foam format and applied on a hard surface with of an applicator.

Method and Use:

In another aspect, there is provided a method for cleaning a hard surface, comprising steps of: optionally wetting the surface, applying a composition according to the present invention on the surface using an applicator; and rinsing the surface with water.

The hard surface herein refers to the surfaces of different household items, in particular, dishes and kitchen utensils etc. Typically washing of dishes and kitchen utensils is part of daily chores of household cleaning. The method may also be used to clean other hard surfaces in the household, such as, kitchen platforms, sinks, tiles, handles, exterior of cupboards, tabletops and in such cases, the surface may be wiped with a cloth instead of rinsing with water post application.

The composition used for cleaning the surface, may be used as neat or may be diluted before use. If it is diluted, preferably, the ratio of dishwash composition to water is in the range 1:3 to 1:20 by weight. Preferably the composition is applied with an applicator. The applicator includes means for spreading the composition uniformly on the surface and optionally scrubbing it. The applicator means includes cloth, sponge, wipes, and scrubber.

There is provided a use of a composition according to the present invention for cleaning a hard surface. The hard surface includes various surfaces of household items, in particular, dishes and kitchen utensils. The use of the composition for cleaning the surfaces provides antimicrobial benefit in addition to removing oily soil and particulates from the surface.

The present invention will now be demonstrated by way of non-limiting examples below. The examples are for illustration only and do not limit the scope of the invention in any manner.

EXAMPLES

Method for Evaluating Antimicrobial Efficacy:

Antimicrobial efficacy was tested following European Suspension Test (EST) or BS EN 1276:2009. In addition, specific test conditions under aforesaid test method, which were followed in below examples, are described below.

The tests were conducted on following bacteria:

*Pseudomonas aeruginosa* ATCC 15442 (Gram-negative)

*Escherichia coli* ATCC 10536 (Gram-negative)

The test bacteria were grown overnight at 37° C. on Tryptone Soy Agar (TSA) plate. The grown culture colonies were re-suspended in 0.9% saline solution. The culture cell density was adjusted to get the final count of $10^8$ colony forming units/ml (CFU/ml), based on a 620 nm optical density (OD) calibration chart.

One ml of test culture was added to 1 ml of 0.3% (w/v) bovine serum albumin (BSA) simulating low soil load, or to 1 ml of 3.0% (w/v) BSA simulating high soil load. This mixture was added to 8 ml of the test solution stored in a container.

After the specified contact time, 1 ml of the above mixture was immediately neutralized in 9 ml Butterfield phosphate buffer with neutralizers or Dey-engley neutralizing broth and plated on Tryptic soy agar in duplicates.

In case of control, 1 ml of the test culture was mixed with 1 ml of 0.3% BSA or 3.0% BSA and added to 8 ml hard water. This was serially diluted and plated on TSA.

After solidification, the plates were incubated at 37° C. for 48 hours, and the residual colonies were counted and the log values of the residual colony forming units (CFUs) was estimated.

Example 1: Evaluation of Antimicrobial Efficacy on *Pseudomonas aeruginosa* in Dishwash Formulations Formulations were prepared according to table 1.

TABLE 1

| | Formulation (% w/w) | | | | | | |
|---|---|---|---|---|---|---|---|
| Material | A | B | C | D | 1 | 2 | 3 |
| SLES | 0.85 | 0.85 | 0.85 | 0.85 | 0.85 | 0.85 | 0.85 |
| EO7 | 5 | 5 | 5 | 5 | 5 | 5 | 5 |
| DGDE | — | 2.5 | — | — | 2.5 | — | 1.25 |
| TGBE | — | — | — | 2.5 | — | — | 1.25 |
| EGHE | — | — | — | — | — | 2.5 | — |
| Alkene amide | — | — | 1 | — | 1 | 1 | 1 |
| Water | Up to 100 | Up to 100 | Up to 100 | Up to 100 | Up to 100 | Up to 100 | Up to 100 |

SLES: Sodium lauryl ether sulphate;
EO7: Alkoxylated alcohol having 7 ethoxy unit per molecule;
DGDE: Dipropylene glycol dimethyl ether;
TGBE: Tripropylene glycol butyl ether;
EGHE: Ethylene glycol hexyl ether;
Alkene amide: N,N dimethyl decenamide;

Formulations A, B, C and D are comparative examples and formulations 1, 2, and 3 are compositions according to the present invention. All formulations were adjusted to pH 8 to 9.

Antimicrobial efficacy of each formulation was tested using the method described above on *Pseudomonas aeruginosa*. Contact time of the formulation was set to 5 minutes which is similar to typical dishwashing condition.

Results are Summarized Below:

TABLE 2

| | Formulation | | | | | | |
|---|---|---|---|---|---|---|---|
| | A | B | C | D | 1 | 2 | 3 |
| Log reduction (*Pseudomonas aeruginosa*) | 0.76 | 0.76 | 2.2 | 2.7 | 3.8 | 5.8 | 4.4 |

From the table 2 it is evident that formulations 1, 2 and 3 show significantly higher reduction in bacterial growth compared to formulation A, B, C and D.

Example 2: Evaluation of Antimicrobial Efficacy on *Escherichia coli*

Formulations were prepared according to table 3.

TABLE 3

| | Formulation (% w/w) | | | | | |
|---|---|---|---|---|---|---|
| Material | E | F | G | H | I | 4 |
| SLES + CAPB (80:20) | 3.4 | 3.4 | 3.4 | 3.4 | 3.4 | 3.4 |
| NaOH | 0.35 | 0.35 | 0.35 | 0.35 | 0.35 | 0.35 |
| Citric acid | 0.25 | 0.25 | 0.25 | 0.25 | 0.25 | 0.25 |
| TGBE | — | 1 | — | — | 1 | 1 |
| EGHE | — | — | — | 1 | 1 | |
| Alkene amide | — | — | 1 | — | — | 1 |
| Water | Up to 100 | Up to 100 | Up to 100 | Up to 100 | Up to 100 | Up to 100 |

SLES: Sodium lauryl ether sulphate
CAPB: Cocoamidopropyl betaine
TGBE: Tripropylene glycol butyl ether
EGHE: Ethylene glycol hexyl ether
Alkene amide: N,N dimethyl decenamide Formulations E, F, G, H and I are comparative example and formulations 4 is a composition according to the present invention.

Antimicrobial efficacy of each formulation was tested using the method described above on *Escherichia coli*. Contact time of the formulation was 10 seconds. Results are summarized below:

TABLE 4

| | Formulation | | | | | |
|---|---|---|---|---|---|---|
| | E | F | G | H | I | 4 |
| Log Reduction (*Escherichia coli*) | 0.03 | 0.06 | 0.1 | 0.04 | 0.27 | 2.66 |

According to table 4, formulation 4 which is a formulation according to the present invention shows significantly higher reduction in bacterial growth compared to formulation D, E, F, G, H and I.

Therefore, it is evident from the examples shown above that the compositions comprising a combination of alkene amide and glycol ether of formula (I) provide significant antimicrobial benefit.

The invention claimed is:

1. An aqueous dishwashing composition comprising:

a) 0.01 to 20% by weight alkene amide;

b) 0.01 to 20% by weight glycol ether of formula (I):

$$R_1O(R_2O)_nR_3;$$

where, $R_1$ is a linear or branched alkyl having 1 to 4 carbon atoms or phenyl group;

$R_2$ is ethyl or isopropyl;

n is 1, 2, 3;

$R_3$ is hydrogen or a linear or branched alkyl or phenyl group having 1 to 10 carbon atoms;

c) 0.1 to 50% by weight surfactant; and d) 20 to 90% by weight water.

2. A composition as claimed in claim 1 wherein the alkene amide comprises 8 to 15 carbon atoms.

3. A composition as claimed in claim 1 comprising 0.1 to 15% by weight of alkene amide.

4. A composition as claimed in claim 1 wherein the alkene amide is a tertiary amide.

5. A composition as claimed in claim 4 wherein the tertiary amide is alkyl substituted N, N tertiary amide.

6. A composition as claimed in claim 5 wherein the alkene amide is N, N di-methyl decenamide.

7. A composition as claimed in claim 1 comprising 0.1 to 15% by weight of the glycol ether.

8. A composition as claimed in claim 1 wherein R3 in the formula (I) of glycol ether comprises 1 to 4 carbon atoms.

9. A composition as claimed in claim 1 wherein the glycol ether is selected from di-propylene glycol dimethyl ether, tri-propylene glycol butyl ether, di-propylene glycol butyl ether and combinations thereof.

10. A composition as claimed in claim 1 wherein the ratio of the alkene amide to the glycol ether is in the range from 5:1 to 1:5 by weight.

11. A composition as claimed in claim 1 wherein the surfactant is selected from anionic surfactant, non-ionic surfactant and combination thereof.

12. A composition as claimed in claim 1 comprising 0.5 to 40% by weight of surfactant.

13. A method for dishwashing, comprising steps of:

optionally wetting the surface;

applying a composition comprising:

0.01 to 20% by weight alkene amide;

0.01 to 20% by weight glycol ether of formula (I):

$$R_1O(R_2O)_nR_3;$$

where, $R_1$ is a linear or branched alkyl or phenyl group having 1 to 8 carbon atoms;

$R_2$ is ethyl or isopropyl;

n is 1, 2, 3;

$R_3$ is hydrogen or a linear or branched alkyl or phenyl group having 1 to 10 carbon atoms;

0.1 to 50% by weight surfactant; and 20 to 90% by weight water on the surface using an applicator; and rinsing the surface with water.

* * * * *